United States Patent

Roh

[11] Patent Number: 6,044,706
[45] Date of Patent: Apr. 4, 2000

[54] DUAL AXIAL GYROSCOPE WITH PIEZOELECTRIC CERAMICS

[75] Inventor: Yong Rae Roh, Daegog Sagyeojeol Town 304-1903, 1438, Dowon-dong, Dalseo-ku, Daeku, Rep. of Korea

[73] Assignees: Yong Rae Roh; Sitraa Korea Co., Ltd., Seoul, both of Rep. of Korea

[21] Appl. No.: 09/066,965

[22] Filed: Apr. 27, 1998

[30] Foreign Application Priority Data

Aug. 13, 1997 [KR] Rep. of Korea .................. 1997-38757

[51] Int. Cl.[7] ................................ G01P 9/04; H01L 41/08
[52] U.S. Cl. ............................ 73/504.12; 73/504.02; 73/514.34; 310/316; 310/321
[58] Field of Search ........................... 73/504.02, 504.03, 73/504.04, 504.08, 504.09, 504, 12, 504.14, 504.15, 514.34; 74/5.6 D, 5 R, 5.34; 310/316, 321, 367, 329, 370

[56] References Cited

U.S. PATENT DOCUMENTS

| | | | |
|---|---|---|---|
| 3,842,681 | 10/1974 | Mumme | 73/504.02 |
| 5,001,940 | 3/1991 | Ogawa | 74/5.6 D |
| 5,045,745 | 9/1991 | Umemoto et al. | 310/329 |
| 5,635,639 | 6/1997 | Grieff et al. | 73/504.04 |
| 5,635,787 | 6/1997 | Mori et al. | 310/316 |
| 5,675,083 | 10/1997 | Nakamura | 73/504.12 |
| 5,847,487 | 12/1998 | Maeno | 310/321 |

OTHER PUBLICATIONS

Ryoo et al., "Design and Fabrication of a Dual Axial Gyroscope with Piezoelectric Ceramics", Feb. 20, 1998.

*Primary Examiner*—Helen C. Kwok
*Attorney, Agent, or Firm*—Sherdian Ross P.C.

[57] ABSTRACT

A piezoelectric device is used in an dual axial gyroscope system and includes a piezoelectric exciter for generating a linear velocity on a first axis; a first piezoelectric detector element, placed on a surface of the piezoelectric exciter in a direction orthogonal to the first axis, for detecting a first Coriolis force provided in a direction orthogonal to the first detector; and as second piezoelectric detector element, placed on the surface of the piezoelectric exciter in a direction orthogonal to the first axis and the first detector, for detecting a second Coriolis force provided in a direction orthogonal to the second detector element.

19 Claims, 3 Drawing Sheets

DUAL AXIAL GYROSCOPE WITH PIEZOELECTRIC CERAMICS

FIELD OF THE INVENTION

The present invention relates to an apparatus for simultaneously detecting a rotating state of an object in horizontal and vertical direction.

DESCRIPTION OF THE PRIOR ART

A gyroscope is widely used in various applications, e.g., an aircraft, a missile, and other vehicles, as a device for measuring an angular rotation with respect to an inertial reference frame or a device for detecting the position of an object. The gyroscope typically employs mechanical components, e.g., rotors and bearings, in order to detect torque from a speedy spinning rotor. However, the mechanical components impose quite a few drawbacks in size, weight, price, and lifetime. Further, they cannot provide high enough sensitivity to come up with the requirement of modern industry. These limitations have motivated development of gyroscopes new in both shapes and materials, i.e., optical fiber, laser, ultrasonic, and piezoelectric types.

One of the piezoelectric type gyroscopes, so-called VYRO, has been introduced in an article by W. D. Gates of "Vibrating Angular Rate Sensor May Threaten the Gyroscope", *Electronics*, 41(10), pp. 130–134(1968). The operational principle of the VYRO is similar to the mechanical gyroscope system. That is, in the mechanical gyroscope system, when a turning moment is applied about one of two orthogonal axes lying at right angles to the rotor axis, inertia forces are generated by the Coriolis effect along the remaining orthogonal axis and a measure of the applied rate of the turn can be derived based on the sensed inertia forces. In the piezoelectric gyroscopes, the axis of oscillation formed by employing a piezoelectric material, e.g., a piezoelectric ceramic, substitutes the rotor axis. In this case, a piezoelectric effect caused by the piezoelectric gyroscope system is capable of producing a higher velocity, which has the apparent potential of generating higher Coriolis inertia forces to be sensed than those of the mechanical gyroscope system, to thereby generate more useful detection signals.

As various advantages including the above can be appreciated, a lot of efforts have been placed in improving the performance of the piezoelectric gyroscope system by using various crystals. For instance, a gyroscope system employing a monocrystaline quartz is disclosed in Swed. Patent No. SE 8 900 666 issued on 1992 to Soderkvist. Various structures of the piezoelectric gyroscope system are also described in articles by T. Nakamura et al., "Designing 17 mm equilateral triangular prism vibrator for a piezoelectric gyroscope", *Nikkei Electronics Asis*, pp. 60(1992) and Y. Shuta et al., "Compact Vibratory Gyroscope", *Jpn. J. Appl. Phys.* Vol. 34, part 1, No. 5B, pp. 2601–2603(1995); and U.S. Pat. No. 5,014,554 issued on 1991 to Terada et al.

In those conventional piezoelectric gyroscope systems, the measurement of the angular rate with respect to a single axis of rotation can be obtained by using a single piezoelectric device. However, since, in various practical situations, it is rather rare that the turning moment is applied only in a predetermined single axis direction, the conventional system should have more than one piezoelectric device in order to effectively detect at least two orthogonal components of the angular velocity to thereby generate their vector sum representing the real rotational axis. In this case, there are inevitable problems such that an extremely precise device arrangement and a complex oscillator structure should be provided in the conventional piezoelectric gyroscope system. Hence, a new piezoelectric gyroscope system is needed that can effectively measure the angular velocities around two orthogonal axes simultaneously through use of one piezoelectric device.

SUMMARY OF THE INVENTION

It is, therefore, an object of the invention to provide a piezoelectric gyroscope system which is capable of effectively measuring the angular velocities around two orthogonal axes simultaneously through use of one piezoelectric device.

Another object of the invention is to provide a single piezoelectric device having a piezoelectric structure which is capable of measuring the angular velocities around two orthogonal axes simultaneously through use of one piezoelectric device in an effective manner.

In accordance with one aspect of the present invention, there is provided a piezoelectric device, for use in a dual axial gyroscope system, comprising: piezoelectric exciter means for generating a linear velocity on a first axis; first piezoelectric detector means, placed on a surface of the piezoelectric exciter means in a direction orthogonal to the first axis, for detecting a first Coriolis force provided in a direction orthogonal to the first detector means; and second piezoelectric detector means, placed on the surface of the piezoelectric exciter means in a direction orthogonal to the first axis and the first detector, for detecting a second Coriolis force provided in a direction orthogonal to the second detector means.

In accordance with another aspect of the present invention, there is provided a dual axis piezoelectric gyroscope system comprising: a waveform generator for generating a sinusoidal voltage signal; a piezoelectric device, in response to the sinusoidal voltage and an external rotational force, for generating two first changes representing a first Coriolis force and two second charges corresponding to a second Coriolis force; first processing means for converting the two first charges to generate first and second detection voltage signals; second processing means for converting the two second charges to generate third and fourth detection voltage signals; first output means for generating a first detection signal representing a difference between the first and the second detection voltage signal; and second output means for generating a second detection signal representing a difference between the third and fourth detection signals.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1A:
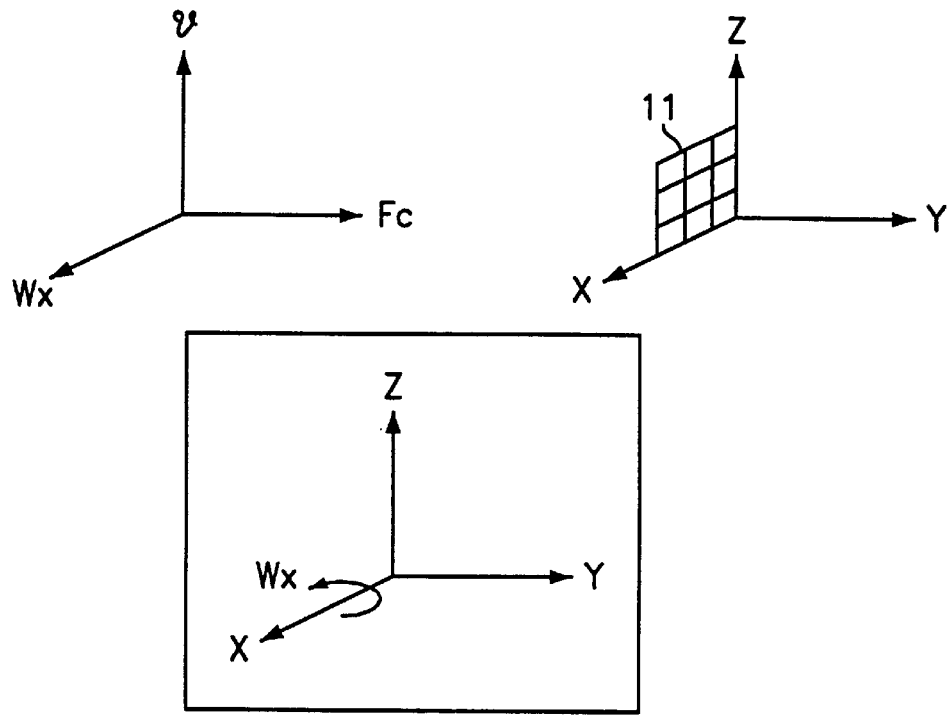
FIGS. 1A and 1B are schematic diagrams describing the operation principle of a dual axial piezoelectric device in accordance with the present invention.
Figure 1B:
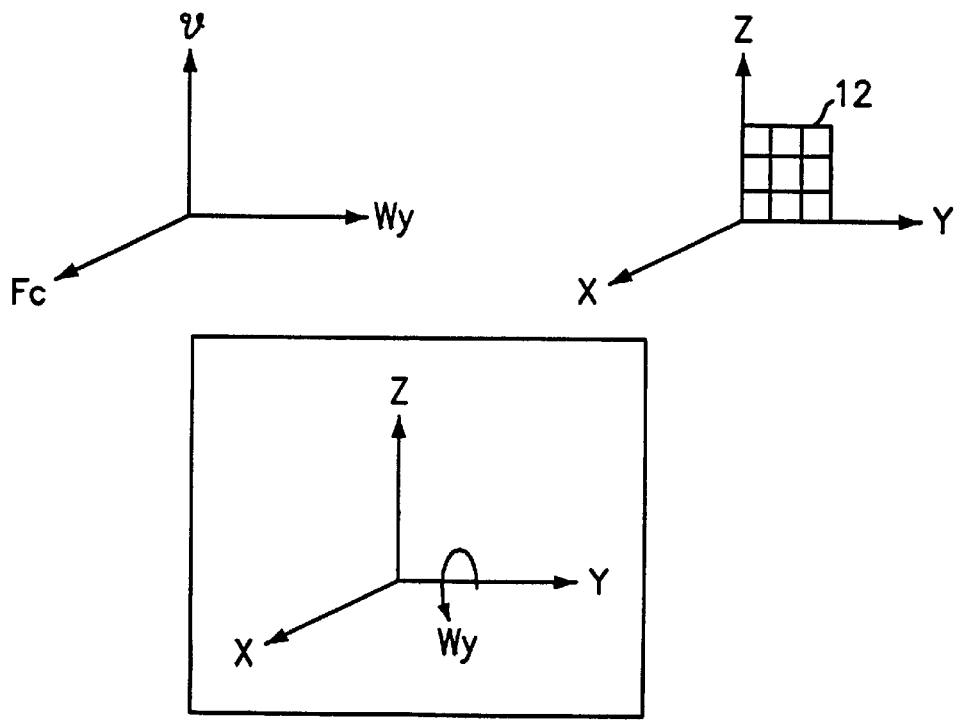

Referring to FIGS. 1A and 1B, there are shown schematic diagrams describing the operation principle of a dual axial piezoelectric device in accordance with the present invention.

As shown, the operation principle of the dual axial piezoelectric device can be described by using the Coriolis principle which is expressed by the equation of rotational motion in inertia coordinates. That is, assuming that an external angular or rotational velocity W is aligned with an axis of rotation, the vibration speed v given by an exciter will, through the Coriolis effect, generate an inertia force corresponding to its vector product with the W. The inertia force, i.e., the Coriolis force F may be then expressed as follows:

$$F = 2 \, mW \times v \quad \text{Eq. (1)}$$

wherein m is the mass of the gyroscope system.

As can be seen from Eq. 1, the Coriolis force F is directly proportional to the angular velocity W, which means that the angular velocity W can be determined directly by measuring the Coriolis force F under given m and v.

On the other hand, a piezoelectric material produces a mechanical displacement when an electric field is applied thereto, and vice versa. A piezoelectric gyroscope system includes two types of piezoelectric crystals: one is an exciter for generating the linear vibration velocity; and the other is a detector or a sensor for detecting the Coriolis force.

The exciter is located normal to the Z-axis to thereby apply the linear velocity v. In the case of applying an angular velocity Wx around the X-axis as designated in FIG. 1a, the Coriolis force Fy is generated along the Y-axis, wherein the angular velocity Wx works with the linear velocity v. In accordance with the present invention, a piezoelectric ceramic 11 is first placed on the X-Z plane in order to detect the Coriolis force Fy.

In case of the application of the angular velocity Wy around the Y-axis as in FIG. 1B, the Coriolis force Fx is generated alone the X-axis. In order to detect the Coriolis force Fx, another piezoelectric ceramic 12 is located on Y-Z plane. That is, in accordance with the present invention, the piezoelectric device includes one exciter element and two detector elements, wherein the two detector elements are located on the exciter element in an orthogonal direction and one detector element is arranged to the other element in an orthogonal direction. As a result, two separate detector elements can detect the Coriolis force along each of the two orthogonal directions and the orthogonal arrangement between two detection elements significantly reduce the interference between the Coriolis forces detected.

Figure 2:
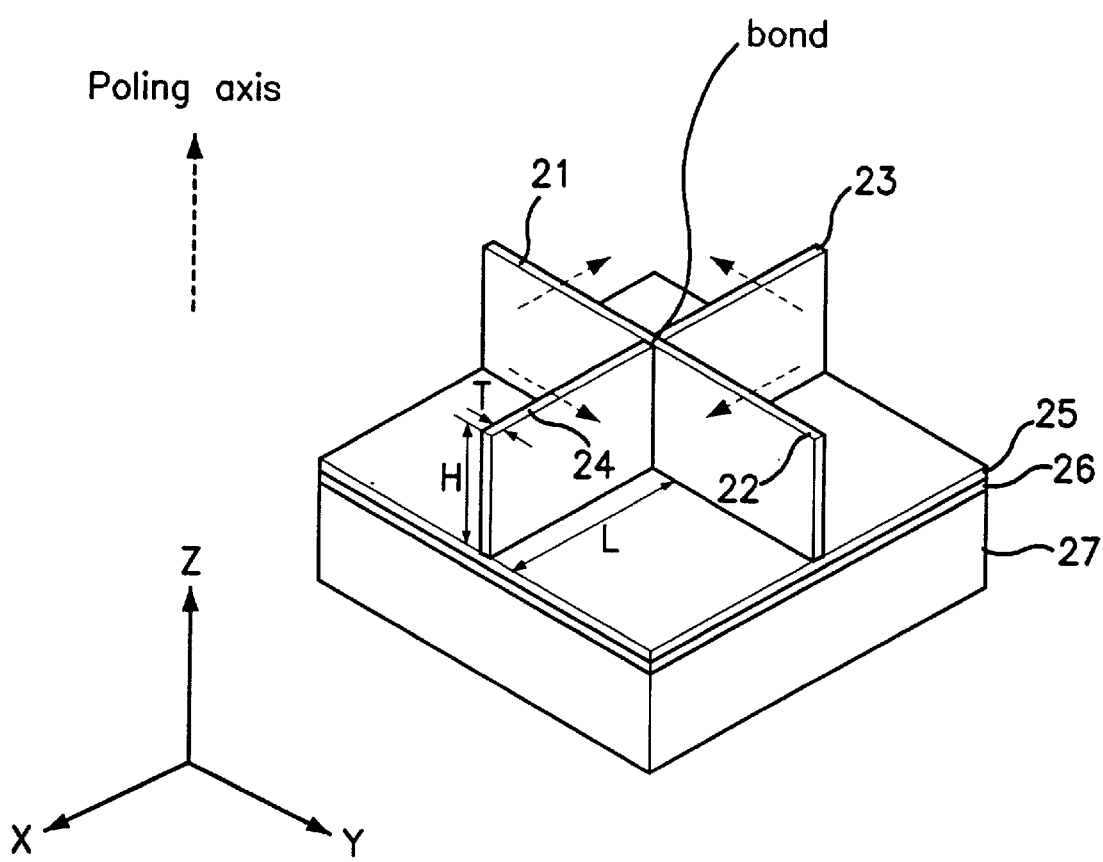
FIG. 2 is a perspective view illustrating the structure of the dual axial piezoelectric device in accordance with the present invention.

Referring to FIG. 2, there is illustrated a piezoelectric device in accordance with the present invention. The piezoelectric device includes a first detector element 21 and 22, a second detector element 23 and 24, and an exciter 26.

The first detector element has a pair of crystal plates 21 and 22 which are arranged on the exciter in an orthogonal direction; and serves to detect the Coriolis force Fx. Each of the crystal plates 21 and 22 has a thickness T, a length L and a height H as designated in FIG. 2.

The second detector element has a pair of crystal plates 23 and 24 which are arranged on the exciter in an orthogonal direction; and serves to detect the Coriolis force Fy. Each of the crystal plates 23 and 24 has a thickness T, a length L and a height H as designated in FIG. 2. The first and the second detector element are arranged in an X-Z plane and a Y-Z plane, respectively, wherein the planes are orthogonal to each other. The exciter includes an exciter element 26 interposed between a metal plate 25 and a base 27, wherein a metal p)late 25 serves to provider an electric ground for the piezoelectric elements and the base serves to support the piezoelectric device. In accordance with a preferred embodiment of the present invention, the base 27 is made of a metal. The exciter element 26 serves to generate a vibration corresponding to the linear velocity v in the Z-axis direction.

On the other hand, a piezoelectric material is always accompanied by its inherent undesirable property, such as a piezoelectricity. The pyroelectric charges reflect the change of environmental temperature surrounding the device having the piezoelectric material and have nothing to do with functional behavior of the gyroscope. Hence, in order to obtain a clear piezoelectric output, the thermal effect. should be compensated by using an appropriate method. In accordance with the present invention, the compensation is obtained by placing two crystal plates, each having an opposite poling direction, side by side for one detector element as shown in FIG. 2 where the dash arrows represent the poling directions of the crystal plates. For example, when the angular velocity Wy is applied to the piezoelectric device, the Coriolis force Fx is generated and detected by the first detector element 21 and 22. Each of output voltages Va and Vb detected from the crystal plates 21 and 22 of the first detector element, consists of a piezoelectric component $V_{piezo}$ and a pyroelectric component $V_{pyro}$ reflecting the effect of piezoelectricity and piezoelectricity, respectively. If the piezoelectric component $V_{piezo}$ from the detector element 21 is positive, and that from the detector element 22 is negative. While the pyroelectric components from both of the elements 21 and 22 have no directional difference.

Therefore, the difference dVab between the output voltage Va and Vb is defined as follows:

$$Va = V_{piezo} + V_{pyro}$$

$$Vb = -V_{piezo} + V_{pyro}$$

$$dVab = Va - Vb = 2V_{piezo} \quad \text{Eq. (2)}$$

As can be seen from Eq. 2, the difference dVab represents purely the piezoelectric effect and is proportional to the Coriolis force. In the similar manner, the above result can be applied to output voltages Vc and Vd from the crystal plates 23 and 24 of the second detector element. In electronic circuits, the difference dVab can be easily obtained by using a conventional differential amplifier.

In the fabrication process of the piezoelectric device, the exciter element 26 and the metal plate !)5 are sequentially bonded on the base 27 by using a conductive adhesive. The crystal plates 21 to 24 are bonded on the exciter in an orthogonal direction to each other by using an insulating epoxy. In accordance with the preferred embodiment of the present invention, the base 27 and the metal plate are made of an elastic invariable metal(permalloy) with a small coefficient of the thermal expansion and a large elastic range. The exciter element 26 is fabricated by using, e.g., one of lead titanate zirconate(PZT) ceramic, $PbTiO_3$ ceramic and $BaTiO_3$ ceramic or, more preferably, by using PZT5A. Preferably, the first and the second detector element and the exciter can be fabricated by using PZT5A. In order for the exciter element 26 to generate a large amplitude vertical vibration with good robustness, its thickness is thicker, e.g., 0.5 mm, than those, e.g., 0.2 mm, of the detector elements. That is, the thickness of the exciter element can be determined arbitrarily as long as it is not the same as that of the detector elements.

All of the detector elements should have the same resonant frequency and the same impedance value sc that all of the elements can have the same sensitivity to the Coriolis force. The height H, length L and thickness T of each crystal plate 21 to 24 are identical to each other. The height H of the crystal plate can be determined based on the desired size of the piezoelectric device although the larger height H thereof provides the higher output voltage.

The length L of the crystal plate is preferably determined in a range of 50%–100% of a maximum height thereof, e.g., 5 mm, in order to obtain an uniform angular moment on the surface thereof without reducing the manufactural facility thereof. The planner dimension of the exciter element 26 is fixed automatically when lengths of the detector elements are determined.

The thickness of the crystal plate is preferably selected in range of ½–1/10 of the maximum height thereof, e.g., 5 mm, in order to obtain a desired selectivity of vibration modes and the desired sensitivity thereof without affecting the manufactural facility and the endurance thereof.

Figure 3:
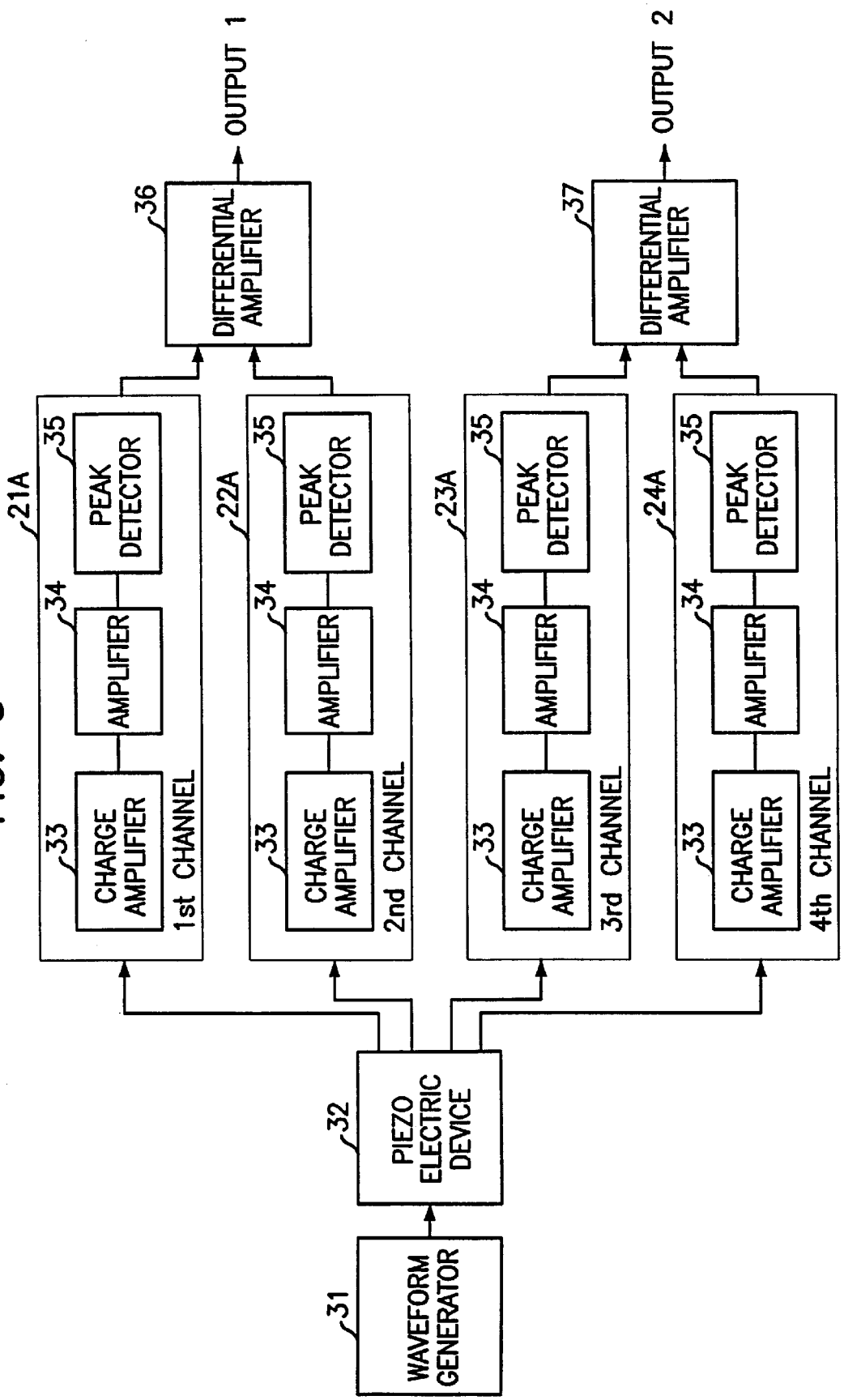
FIG. 3 is a detailed block diagram of the dual axial piezoelectric gyroscope system employing the dual axial piezoelectric device shown in FIG. 2.

Referring to FIG. 3, there is shown a schematic block diagram of the gyroscope system employing the piezoelectric device in accordance with the present invention. The gyroscope system includes a waveform generator 31, the piezoelectric device 32, four channels 21A to 24A and two differential amplifiers 36 and 37.

The waveform generator 31 is implemented by using an astable multivibrator which serves to drive a sinusoidal voltage to the exciter element contained in the piezoelectric device. As can be seen from the above, charges are produced from the crystal plates contained in the piezoelectric device in proportion to an external rotational velocity. The charge from each crystal plate is then coupled to a corresponding channel. Each of the channels 21A to 24A includes a first charge amplifier 33, a second amplifier 34 and a peak detector 35. The input charge is then transformed to a voltage signal by the first charge amplifier 33. The voltage signal, which is still low in level, is relayed to the second amplifier 34 which further amplifies it to generate an amplified voltage signal.

The amplified voltage signal includes a pseudo frequency component w1 and a rotational velocity frequency component w2 and is represented as follows:

$$V \text{ v} \times W$$
$$= U \cos(w1t) \times W \cos(w2t + \Phi) \quad \text{Eq. (3)}$$

wherein U and w1 are constants and $\Phi$ is a small number reflecting the phase difference between v and W.

Since the pseudo frequency component is greater than the rotational velocity frequency component, the amplified voltage signal has such a waveform that the rotational velocity frequency component is modulated by using the pseudo frequency component. Accordingly, the peak detector 35 extracts a voltage signal having the rotational velocity frequency component to provide it to the differential amplifier 36. The differential amplifier 36 receives the output voltage Va from the first channel 21A and the output voltage Vb from the second channel 22A to generate a first differential voltage signal dVab.

On the other hand, the differential amplifier 37 receives the output voltage Vc from the first channel 23A and the output voltage Vd from the second channel 24A to generate a second differential voltage signal dVcd. As can be seen from Eq. 2, each of the first and the second differential voltage signal dVab and dVcd only includes a component generated by a pure external rotational force.

As can be seen from the above, rost conventional current piezoelectric gyroscope system has a piezoelectric device of the single axial type, and can only measure the angular velocity about a single axis of rotation. In contrast, the new type of dual axial gyroscope system in accordance with the present invention effectively provides the simultaneous measurement of the angular velocities around two rotational axes.

While the present invention has between shown and described with reference to the particular embodiments, it will be apparent to those skilled in the art that many changes and modifications may be made without departing from the spirit ad scope of the invention as defined in the appended claims.

What is claimed is:

1. A piezoelectric device, for use in a dual axial gyroscope system, comprising:

piezoelectric exciter means shaped in plate disposed in a first plane, for generating a linear velocity;

first piezoelectric detector means, placed on a surface of the piezoelectric exciter means and shaped in plate disposed in a second plane, for detecting a first Coriolis force provided in a direction orthogonal to the second plane, said second plane being orthogonal to the first plane; and second piezoelectric detector means, placed on the surface of the piezoelectric exciter means and shaped in plate disposed in a third plane, for detecting a second Coriolis force provided in a direction orthogonal to the the third plane, said third plane being orthogonal to both the first plane and the second plane.

2. The piezoelectric device as recited in claim 1, wherein the first piezoelectric detector means includes two piezoelectric plates placed side by side on the second plane, and wherein each piezoelectric plate has an opposite poling direction.

3. The piezoelectric device as recited in claim 2, wherein the second piezoelectric detector means includes two piezoelectric plates placed side by side on the third plane, and wherein each piezoelectric plate has an opposite poling direction.

4. The piezoelectric device as recited in claim 3, wherein the piezoelectric exciter means includes:

a base forming a bottom portion of the piezoelectric exciter means;

a metal plate forming the surface of the piezoelectric exciter means; and a piezoelectric exciter plate interposed between the base and the metal plate.

5. The piezoelectric device as recited in claim 4, wherein the thickness of piezoelectric exciter means plate of the piezoelectric exciter means is greater than the thickness of the piezoelectric plates for the first and the second piezoelectric detector means.

6. The piezoelectric device as recited in claim 4, wherein the piezoelectric exciter plate is made of one of PZT type ceramic, PbTiO3 type ceramic and BaTiO3 type ceramic.

7. The piezoelectric device as recited in claim 4, wherein the piezoelectric plates for the first and the second piezoelectric detector means are bonded to the metal plate by using an insulating epoxy and the piezoelectric exciter plate of the piezoelectric exciter means is made of a PZT5A type ceramic.

8. The piezoelectric device as recited in claim 4, wherein the length of the piezoelectric plate is determined in a range of 50% to 100% of a maximum height thereof and the thickness of the piezoelectric plate is selected in a range of ½ to 1/10 of the maximum height thereof.

9. The piezoelectric device as recited in claim 8, the thickness of the piezoelectric exciter means is 0.5 mm.

10. The piezoelectric device as recited in claim 4, wherein the base, the metal plate and the piezoelectric exciter means are glued to each other by using a conductive adhesive.

11. The piezoelectric device as recited in claim 10, wherein the base and the metal plate are made of an elastic invariable metal (permalloy).

12. The piezoelectric device as recited in claim 4, wherein the piezoelectric plates for said first and said second piezoelectric detector means are bonded on the surface of the metal plate of the piezoelectric exciter means by using an insulating adhesive.

13. A dual axis piezoelectric gyroscope system comprising:

a waveform generator for generating a sinusoidal voltage signal;

a piezoelectric device, in response to the sinusoidal voltage signal and an external rotational force, for generating two first charges representing a first Coriolis force and two second charges corresponding to a second Coriolis force;

first processing means for converting the two first charges to generate first and second detection voltage signals;

second processing means for converting the two second charges to generate third and fourth detection voltage signals;

first output means for generating a first detection signal representing a difference between the first and second detection voltage signals; and second output means for generating a second detection signal representing a difference between the third and fourth detection voltage signals, wherein, said piezoelectric device comprises:

piezoelectric exciter means, in response to the sinusoidal voltage, for generating a linear velocity on a first axis;

first piezoelectric detector means, placed on a surface of the piezoelectric exciter means in a direction orthogonal to the first axis, for detecting the first Coriolis force provided in a direction orthogonal to the first detector means to generate said two first charges; and second Piezoelectric detector means, placed on the surface of the piezoelectric exciter means in a direction orthogonal to the first axis and the first piezoelectric detector means, for detecting the second Coriolis force provided in a direction orthogonal to the second detector means to generate said two second charges.

14. The dual axis piezoelectric gyroscope system as recited in claim 13, wherein each of the first and the second processing means includes two channels, each channel including:

a first charge amplifier for converting the charge to a voltage signal;

a second amplifier for amplifying the voltage signal to generate an amplified voltage signal; and a peak detector for stabilizing the amplified voltage signal to generate a detection voltage signal.

15. The dual axis piezoelectric gyroscope system as recited in claim 14, wherein the first and the second output means are implemented by using a differential amplifier.

16. The dual axis piezoelectric gyroscope system as recited in claim 12, wherein the first piezoelectric detector means includes two piezoelectric plates placed side by side on a plane formed by the first axis and a second axis orthogonal to the first Coriolis force, wherein each piezoelectric plate has an opposite poling direction.

17. The dual axis piezoelectric gyroscope system as recited in claim 16, wherein the second piezoelectric detector means includes two piezoelectric plates placed side by side on a plane formed by the first axis and a third axis orthogonal to the second Coriolis force, wherein each piezoelectric plate has an opposite poling direction.

18. The dual axis piezoelectric gyroscope system as recited in claim 17, wherein the piezoelectric exciter means includes:

a base forming a bottom portion of the piezoelectric exciter means;

a metal plate forming the surface of the piezoelectric exciter means; and a piezoelectric exciter plate interposed between the base and the metal plate.

19. The dual axis piezoelectric gyroscope system as recited in claim 18, wherein the thickness of piezoelectric exciter plate of the piezoelectric exciter means is greater than those of the piezoelectric plates for the first and the second piezoelectric detector means.

\* \* \* \* \*